US006872305B2

(12) United States Patent
Johnson et al.

(10) Patent No.: US 6,872,305 B2
(45) Date of Patent: Mar. 29, 2005

(54) MEMBRANE FILTRATION SYSTEM

(75) Inventors: Warren Thomas Johnson, Grose Vale (AU); Peter Rogers, Belper (GB)

(73) Assignee: U.S. Filter Wastewater Group, Inc., Warrendale, PA (US)

(*) Notice: Subject to any disclaimer, the term of this patent is extended or adjusted under 35 U.S.C. 154(b) by 0 days.

(21) Appl. No.: 10/406,807

(22) Filed: Apr. 2, 2003

(65) Prior Publication Data

US 2003/0234221 A1 Dec. 25, 2003

Related U.S. Application Data

(63) Continuation of application No. PCT/AU01/01248, filed on Oct. 3, 2001.

(30) Foreign Application Priority Data

Oct. 9, 2000 (AU) .............................................. PR0648

(51) Int. Cl.$^7$ .................................................. C02F 9/00
(52) U.S. Cl. .............................. 210/257.2; 210/321.88; 210/330; 210/323.2
(58) Field of Search .................... 210/257.2, 321.8, 210/195.1, 323.2, 406, 456, 636, 650

(56) References Cited

U.S. PATENT DOCUMENTS

| | | |
|---|---|---|
| 3,228,876 A | 1/1966 | Mahon |
| 3,693,406 A | 9/1972 | Tobin |
| 3,968,192 A | 7/1976 | Hoffman et al. |
| 3,992,301 A | 11/1976 | Shippey et al. |
| 3,993,816 A * | 11/1976 | Baudet et al. ................ 428/45 |
| 4,188,817 A | 2/1980 | Steigelmann |
| 4,192,750 A | 3/1980 | Elfes et al. |
| 4,193,780 A | 3/1980 | Cotton et al. |
| 4,218,324 A | 8/1980 | Hartmann et al. |
| 4,248,648 A | 2/1981 | Kopp |

(Continued)

FOREIGN PATENT DOCUMENTS

| | | |
|---|---|---|
| DE | 4 117 422 | 11/1992 |
| EP | 0 463 627 B1 | 5/1995 |
| EP | 0 763 758 A1 | 10/1996 |
| EP | 1 052 012 A1 | 11/2000 |
| FR | 2 674 448 A1 | 2/1992 |
| GB | 2 253 572 A | 9/1992 |
| JP | 58-088007 | 5/1983 |
| JP | 61-097006 | 5/1986 |
| JP | 61-107905 | 5/1986 |
| JP | 61-257203 | 11/1986 |
| JP | 61-263605 | 11/1986 |
| JP | 62-004408 | 1/1987 |
| JP | 62-114609 | 5/1987 |
| JP | 62-140607 | 6/1987 |
| JP | 62-179540 | 8/1987 |

(Continued)

OTHER PUBLICATIONS

U.S. Appl. No. 10/298,471, filed Nov. 15, 2002, Gallagher et al.
U.S. Appl. No. 10/369,813, filed Feb. 18, 2003, Zha et al.
U.S. Appl. No. 10/423,044, filed Apr. 23, 2003, Phelps.
U.S. Appl. No. 10/428,601, filed May 1, 2003, Zha et al.
U.S. Appl. No. 10/437,202, filed May 12, 2003, Muller.
U.S. Appl. No. 29/119,130, filed Feb. 24, 2000, Johnson et al.
Almulla et al., Desalination 153 (2002) 237–243.
Rosenberger et al., Desalination 151 (2002) 195–200.

*Primary Examiner*—Ana Fortuna
(74) *Attorney, Agent, or Firm*—Knobbe Martens Olson & Bear LLP

(57) ABSTRACT

A method and apparatus for reducing volume of feed liquid required in a porous membrane filtration system having a number of porous membranes (6) submersed in a volume of feed liquid to be filtered is provided, the method comprising the step of providing filler elements (9) within said volume of feed liquid to be filtered.

14 Claims, 5 Drawing Sheets

U.S. PATENT DOCUMENTS

| | | |
|---|---|---|
| 4,384,474 A | 5/1983 | Kowalski |
| 4,385,150 A | 5/1983 | Miyake et al. |
| 4,451,369 A | 5/1984 | Sekino et al. |
| 4,511,471 A | 4/1985 | Müller |
| 4,540,490 A | 9/1985 | Shibata et al. |
| 4,547,289 A | 10/1985 | Okano et al. |
| 4,609,465 A | 9/1986 | Miller |
| 4,614,109 A | 9/1986 | Hoffman |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis |
| 4,656,865 A | 4/1987 | Callan |
| 4,660,411 A | 4/1987 | Reid |
| 4,670,145 A | 6/1987 | Edwards |
| 4,673,507 A | 6/1987 | Brown |
| 4,687,561 A | 8/1987 | Kunz |
| 4,688,511 A | 8/1987 | Gerlach et al. |
| 4,718,270 A | 1/1988 | Storr |
| 4,744,240 A | 5/1988 | Reichelt |
| 4,756,875 A | 7/1988 | Tajima et al. |
| 4,763,612 A | 8/1988 | Iwanami |
| 4,767,539 A | 8/1988 | Ford |
| 4,779,448 A | 10/1988 | Gogins |
| 4,784,771 A | 11/1988 | Wathen et al. |
| 4,793,932 A | 12/1988 | Ford et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,840,227 A * | 6/1989 | Schmidt ..................... 165/162 |
| 4,846,970 A | 7/1989 | Bertelsen et al. |
| 4,876,006 A | 10/1989 | Ohkubo et al. |
| 4,876,012 A | 10/1989 | Kopp et al. |
| 4,921,610 A | 5/1990 | Ford et al. |
| 4,931,186 A | 6/1990 | Ford et al. |
| 4,935,143 A | 6/1990 | Kopp et al. |
| 4,952,317 A * | 8/1990 | Culkin ....................... 210/636 |
| 4,999,038 A | 3/1991 | Lundberg |
| 5,005,430 A | 4/1991 | Kibler et al. |
| 5,024,762 A | 6/1991 | Ford et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,076,925 A | 12/1991 | Roesink et al. |
| 5,079,272 A | 1/1992 | Allegrezza et al. |
| 5,094,750 A | 3/1992 | Kopp et al. |
| 5,104,546 A | 4/1992 | Filson et al. |
| H1045 H | 5/1992 | Wilson |
| 5,137,631 A | 8/1992 | Eckman et al. |
| 5,138,870 A | 8/1992 | Lyssy |
| 5,151,191 A | 9/1992 | Sunaoka et al. |
| 5,151,193 A | 9/1992 | Grobe et al. |
| 5,158,721 A | 10/1992 | Allegrezza et al. |
| 5,192,456 A | 3/1993 | Ishida et al. |
| 5,194,149 A | 3/1993 | Selbie et al. |
| 5,198,116 A | 3/1993 | Comstock et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,297,420 A | 3/1994 | Gilliland et al. |
| 5,320,760 A | 6/1994 | Freund et al. |
| 5,353,630 A | 10/1994 | Soda et al. |
| 5,361,625 A | 11/1994 | Ylvisaker |
| 5,364,527 A | 11/1994 | Zimmerman et al. |
| 5,389,260 A | 2/1995 | Hemp |
| 5,401,401 A | 3/1995 | Hickok |
| 5,403,479 A | 4/1995 | Smith et al. |
| 5,405,528 A | 4/1995 | Selbie et al. |
| 5,417,101 A | 5/1995 | Weich |
| 5,419,816 A | 5/1995 | Sampson et al. |
| 5,451,317 A * | 9/1995 | Ishida et al. ................. 210/332 |
| 5,470,469 A | 11/1995 | Eckman |
| 5,477,731 A | 12/1995 | Mouton |
| 5,480,553 A | 1/1996 | Yamamori et al. |
| 5,531,848 A | 7/1996 | Brinda et al. |
| 5,531,900 A | 7/1996 | Raghaven et al. |
| 5,543,002 A | 8/1996 | Brinda et al. |
| 5,554,283 A | 9/1996 | Brinda et al. |
| 5,607,593 A * | 3/1997 | Cote et al. ................... 210/650 |
| 5,639,373 A | 6/1997 | Mahendran et al. |
| 5,643,455 A | 7/1997 | Kopp et al. |
| D396,046 S | 7/1998 | Scheel et al. |
| 5,783,083 A * | 7/1998 | Henshaw et al. ........... 210/636 |
| D396,726 S | 8/1998 | Sadr et al. |
| D400,890 S | 11/1998 | Gambardella |
| 5,910,250 A | 6/1999 | Mahendran et al. |
| 5,914,039 A | 6/1999 | Mahendran |
| 5,918,264 A | 6/1999 | Drummond et al. |
| 5,942,113 A | 8/1999 | Morimura |
| 5,944,997 A | 8/1999 | Pedersen et al. |
| 6,024,872 A | 2/2000 | Mahendran |
| 6,039,872 A | 3/2000 | Wu et al. |
| 6,042,677 A | 3/2000 | Mahendran et al. |
| 6,048,454 A | 4/2000 | Jenkins |
| 6,077,435 A | 6/2000 | Beck et al. |
| 6,083,393 A | 7/2000 | Wu et al. |
| 6,146,747 A | 11/2000 | Wang et al. |
| 6,156,200 A | 12/2000 | Zha et al. |
| 6,159,373 A | 12/2000 | Beck et al. |
| 6,193,890 B1 | 2/2001 | Pederson et al. |
| 6,202,475 B1 | 3/2001 | Selbie et al. |
| 6,254,773 B1 | 7/2001 | Biltoft |
| 6,280,626 B1 * | 8/2001 | Miyashita et al. ........... 210/636 |
| 6,294,039 B1 | 9/2001 | Mahendran et al. |
| 6,315,895 B1 * | 11/2001 | Summerton et al. ....... 210/96.2 |
| 6,325,928 B1 * | 12/2001 | Pedersen et al. ............. 210/232 |
| RE37,549 E | 2/2002 | Mahendran et al. |
| 6,354,444 B1 | 3/2002 | Mahendran |
| 6,440,303 B2 | 8/2002 | Spriegel |
| D462,699 S | 9/2002 | Johnson et al. |
| 6,524,481 B2 | 2/2003 | Zha et al. |
| 6,555,005 B1 | 4/2003 | Zha et al. |
| 6,635,179 B1 * | 10/2003 | Summerton et al. ........ 210/650 |
| 2002/0148767 A1 | 10/2002 | Johnson et al. |
| 2002/0153299 A1 | 10/2002 | Mahendran et al. |
| 2002/0195390 A1 | 12/2002 | Zha et al. |
| 2003/0075504 A1 | 4/2003 | Zha et al. |
| 2003/0089659 A1 | 5/2003 | Zha et al. |
| 2003/0136746 A1 | 7/2003 | Behman et al. |

FOREIGN PATENT DOCUMENTS

| | | |
|---|---|---|
| JP | 63-097634 | 4/1988 |
| JP | 01-307409 | 12/1989 |
| JP | 02-164423 | 6/1990 |
| JP | 02-284035 | 11/1990 |
| JP | 03-018373 | 1/1991 |
| JP | 03-028797 | 2/1991 |
| JP | 31-010445 | 5/1991 |
| JP | 04-310223 | 11/1992 |
| JP | 05-023557 | 2/1993 |
| JP | 05-157654 | 6/1993 |
| JP | 06-071120 | 3/1994 |
| JP | 06-114240 | 4/1994 |
| JP | 07-000770 | 1/1995 |
| JP | 07-275665 | 10/1995 |
| JP | 08-010585 | 1/1996 |

| | | | | | |
|---|---|---|---|---|---|
| JP | 09-141063 | 6/1997 | WO | WO 96/41676 | 12/1996 |
| JP | 10-156149 | 6/1998 | * cited by examiner | | |
| WO | WO 90/00434 | 1/1990 | | | |

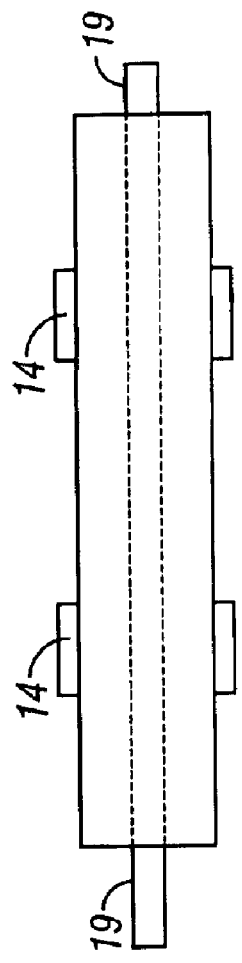
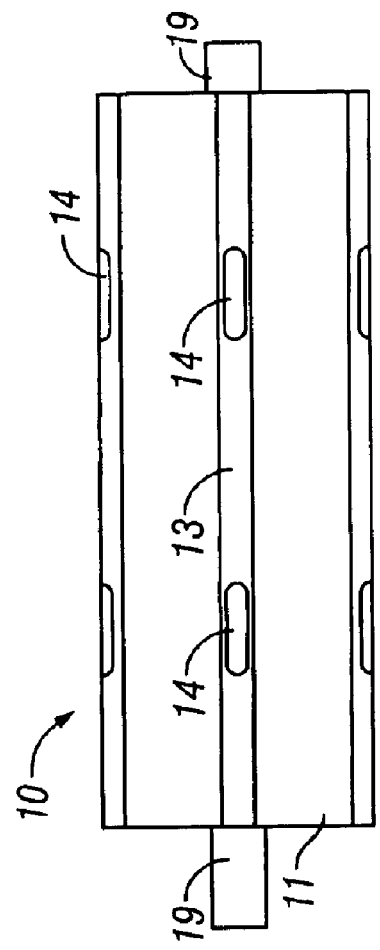
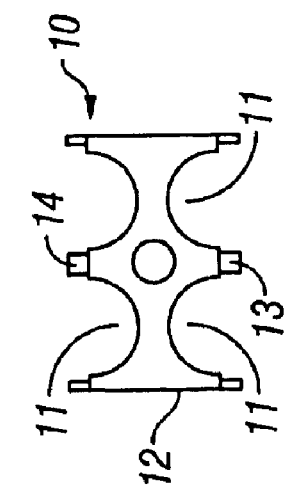
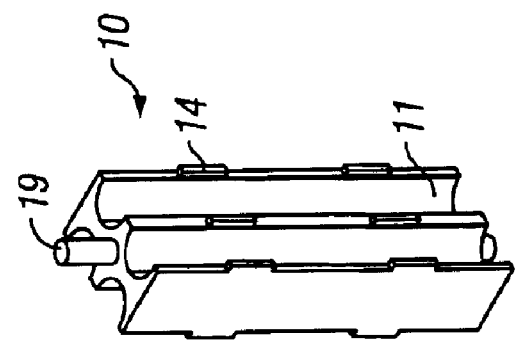
FIG. 4
FIG. 5
FIG. 6
FIG. 7

MEMBRANE FILTRATION SYSTEM

This application is a continuation, under 35 U.S. § 120, of International Patent Application No. PCT/AU01/01248, filed on Oct. 3, 2001 under the Patent Cooperation Treaty (PCT), which was published by the International Bureau in English on Apr. 18, 2002, which designates the U.S. and claims the benefit of Australian Provisional Patent Application No. PR 0648, filed Oct. 9, 2000.

FIELD OF THE INVENTION

The present invention relates to membrane filtration systems, and more particularly to those systems employing porous or permeable membranes located in a tank or cell open to atmosphere.

BACKGROUND ART

Any discussion of the prior art throughout the specification should in no way be considered as an admission that such prior art is widely known or forms part of common general knowledge in the field.

Porous membrane filtration systems require regular backwashing of the membranes to maintain filtration efficiency and flux while reducing transmembrane pressure (TMP) which rises as the membrane pores become clogged with impurities. Typically, during the backwash cycle the impurities are forced out of the membrane pores by pressurised gas, liquid or both into the feed tank or cell. The liquid containing impurities and deposits from the membranes is then drained or flushed from the tank.

The waste liquid displaced from the tank needs to be disposed of or reprocessed, usually in an environmentally safe manner, so any reduction in the volume of such waste liquid is seen as advantageous in terms of environmental impact and cost.

The draining or flushing of the tank, particularly when large arrays of membranes are used also requires time which results in down time of the filtration cycle. In order to reduce this down time large pumping systems are required to quickly drain and refill the tank. Where tanks or cells are arranged in banks and feed is used to refill the tank, a lowering in levels in other cells may be produced during the refill process. This again impinges on operating efficiency of the filtration system.

Further, in filtration systems employing gas bubble scouring of the membranes it has been found advantageous to confine the bubbles as much as possible in the region of the membranes to assist with the scouring process.

Reduction in backwash volume also reduces the volume of chemical cleaning agents required in some systems. This has the two-fold advantage of reducing cost in terms of chemical requirements while also reducing waste disposal problems.

It has been found advantageous to reduce the volume of feed liquid in the filtration cell to ameliorate the above problems and provide at least some of the advantages outlined above.

DISCLOSURE OF THE INVENTION

The present invention seeks to overcome one or more of the abovementioned problems of the prior art, provide one or more of the advantages outlined above or at least provide a useful alternative by reducing the feed volume presented to the porous membranes in a simple, cost effective manner.

According to one aspect, the present invention provides a method of reducing volume of feed liquid required in a membrane filtration system having a number of porous membranes submersed in a volume of feed liquid to be filtered, the method comprising the step of providing filler elements within said volume of feed liquid to be filtered.

Preferably, the filler elements substantially fill voids between the porous membranes while still permitting liquid flow communication with the membranes.

According to another aspect, the present invention provides a membrane filtration system having a number of porous membranes submersed in a volume of feed liquid to be filtered, wherein one or more filler members are provided in voids between said membranes to reduce said volume.

In one preferred form the membranes are porous hollow fibre membranes arranged in bundles to form membrane modules. The modules are submersed in a liquid volume provided in a tank or cell open to atmospheric pressure. In this form of the invention, the voids between the modules are at least partially filled by a filler member or members.

Preferably, the filler members are each formed of a number of elements which fit together to form an integral unit. This enables the filler members to be assembled around the membranes modules without the need for removal of the modules. This assists in initial set-up as well as with replacement and maintenance regimes.

The filler elements may comprise spheres, preferably hollow, which can be packed around the membranes to fill the voids. The spheres are preferably sized to avoid blocking or passing through any of the inlet/outlet ports or valves associated with the filtration system.

BRIEF DESCRIPTION OF THE DRAWINGS

Preferred embodiments of the invention will now be described, by way of example only, with reference to the accompanying drawings, in which:

FIG. 4 shows an end elevation view of a central filler member of FIG. 3;

FIG. 5 shows a side elevation view of the filler member of FIG. 4;

FIG. 6 shows a perspective view of the filler member of FIG. 4;

FIG. 7 shows a plan view of the filler member of FIG. 4;

DESCRIPTION OF PREFERRED EMBODIMENTS

Figure 1:
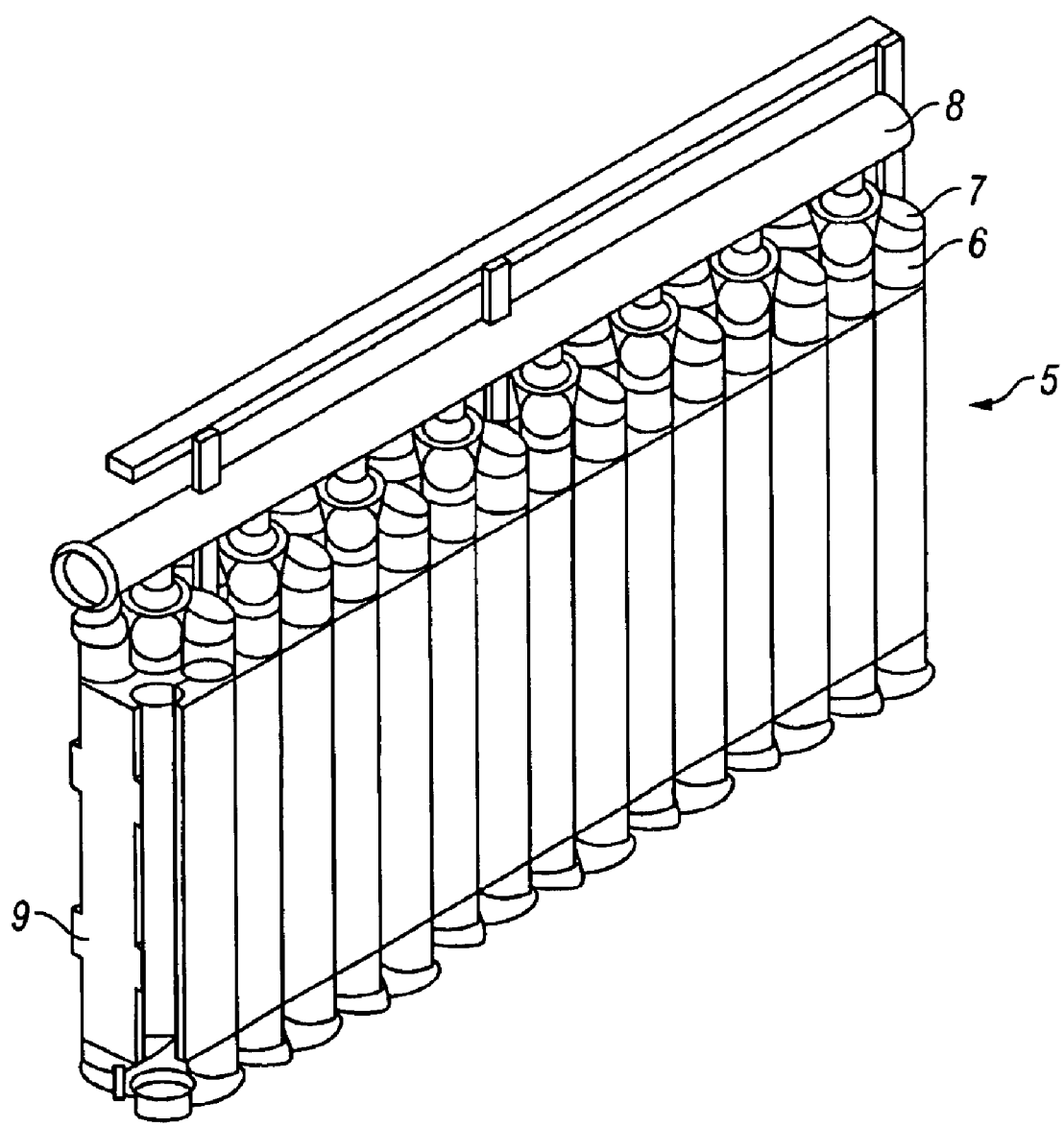
FIG. 1 shows a perspective view of a bank of filtration modules having filler members according to one embodiment of the invention.
Figure 2:
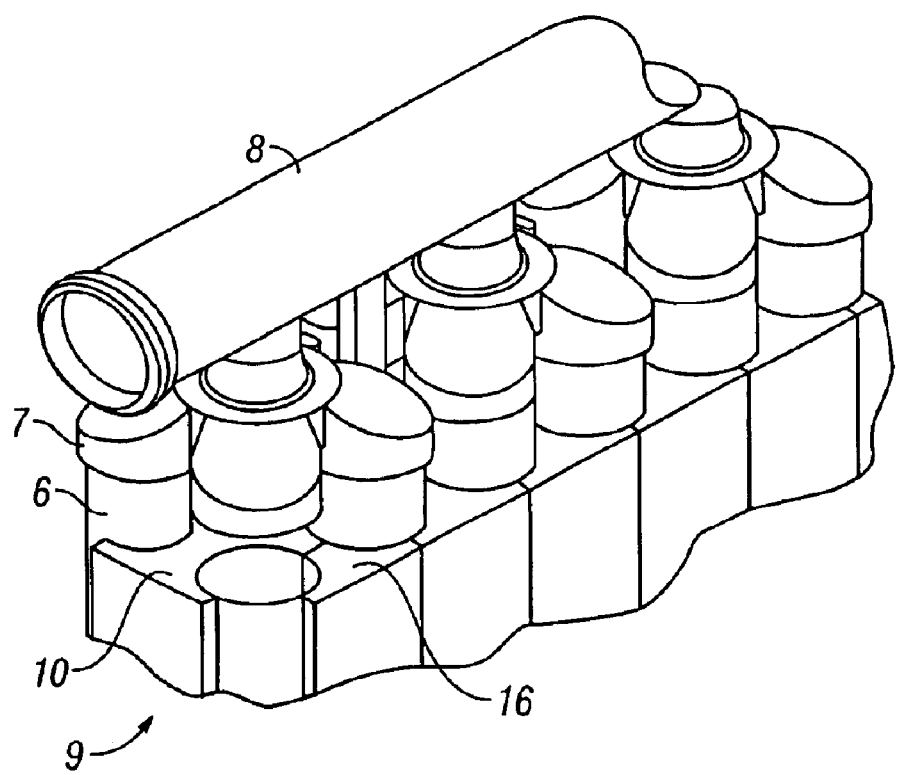
FIG. 2 shows an enlarged perspective view of the upper portion of the bank of filtration modules of FIG. 1.
Figure 3:
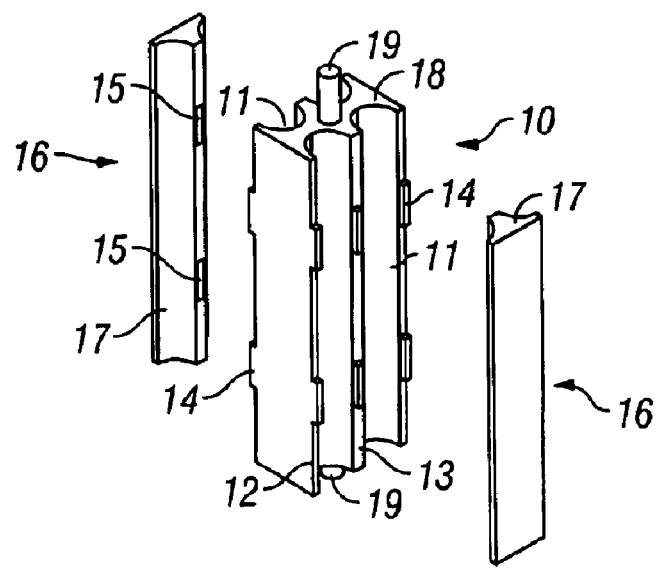
FIG. 3 shows an exploded view of the filler members of FIG. 1 as they would be assembled around a filtration module.
Figure 9:
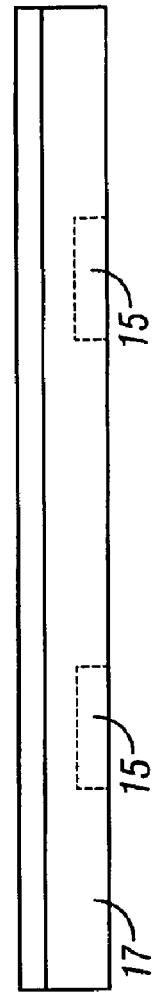
FIG. 9 shows a side elevation view of the filler member of FIG. 8.
Figure 8:
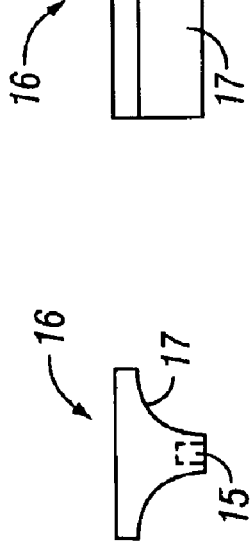
FIG. 8 shows an end elevation view of side filler member of FIG. 3.
Figure 11:
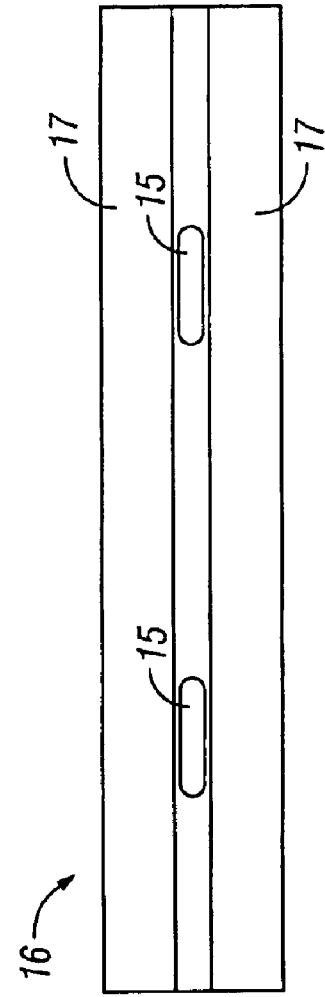
FIG. 11 shows a plan view of the filler member of FIG. 8.
Figure 10:
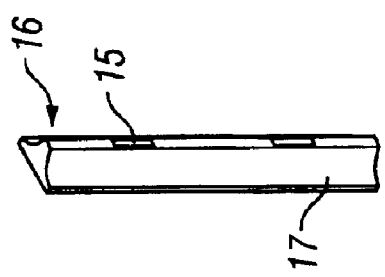
FIG. 10 shows a perspective view of the filler member of FIG. 8.

Referring to the drawings, the embodiments will be described in relation to a manifold and filtration system disclosed in our co-pending PCT Application No. WO 00/62908 (which is incorporated herein by cross-reference), however, it will be appreciated that the invention is equally applicable to other forms of filtration system requiring similar advantages.

The system includes a bank 5 of filter submodules 6 each attached in groups to a membrane filtration manifold 7. In this embodiment, the submodules 6 comprise elongate bundles of porous hollow fibre membranes (not shown) typically enclosed by a supporting cage (not shown). The submodules 6 are positioned within a feed tank or cell (not shown) and when the tank is filled the sub-modules are immersed in feed liquid. Each manifold 7 is connected to a filtrate conduit 8 for removal of filtrate.

During the backwash process, the fibre bundles of submodules 6 are cleaned externally by air bubbles or a mixture of air/liquid injected into each submodule to scrub the outer surfaces of the fibre membranes. The submodules 6 may also be further cleaned by backwashing liquid and/or gas through the fibre pores.

In accordance with this embodiment, in order to reduce backwash volume, each submodule 6 is encased partially by a number of filler members 9 which are segmented to allow each to fit closely around the elongate fibre bundles. In this embodiment, the filler members 9 are spaced from the upper and lower manifolds 7 to allow for flow of liquid and/or impurities in and out of the submodules 6. It will be appreciated that other arrangements to allow liquid flow can also be employed, for example, the filler members 9 could be spaced radially from the outer periphery of each fibre bundle submodule 6 or various shapes of filler member 9 could be used which allowed for liquid flow to and from the submodule 6 while still substantially filling the voids between each submodule 6.

In this system, which employs a gas bubble scouring method, the use of the filler members 9 provides an additional advantage of confining the gas bubbles within the submodules 6 and thus improving scouring efficiency.

As best shown in FIGS. 3 to 11, the filler members 9 are formed from complementary segments comprising a central or core element 10 having two sets of parallel opposed semi-circular, in cross-section, channels 11 extending longitudinally along the length of the central element 10. The channels 11 have a diameter sized to accommodate and fit closely around the submodule 6. The sides 12 and inner edge 13 of the element 10 are provided with outwardly extending tabs or bosses 14 which mate with complementary slots 15 on other filler segments 16 to provide, in use, an integral filler member 9.

The side filler segments 16 are generally T-shaped in cross-section with half-semi circular sides 17 of the same diameter as the central element 10.

The top and bottom surface 18 of the central element 10 are provided with a spacer peg 19 which positions the filler element 9 in a spatial relationship from the manifold 7 to allow fluid flow to and from the top and bottom of the fibre bundles.

The filler members 9 are desirably formed from material which is resistant to any destructive substances present in the feed stream as well as chemicals, gases, etc. which may be used in the backwash or other cleaning processes. The filler members 9 are also desirably of neutral buoyancy so they will remain in position during submersion of the submodules in the feed tank. They can be formed from foamed plastics material such as polyethylene foam or blow or rotor moulded plastic. When blow-moulded, the filler elements may be hollow to allow for filling with a fluid (usually water) to produce the required neutral buoyancy.

Figure 12:
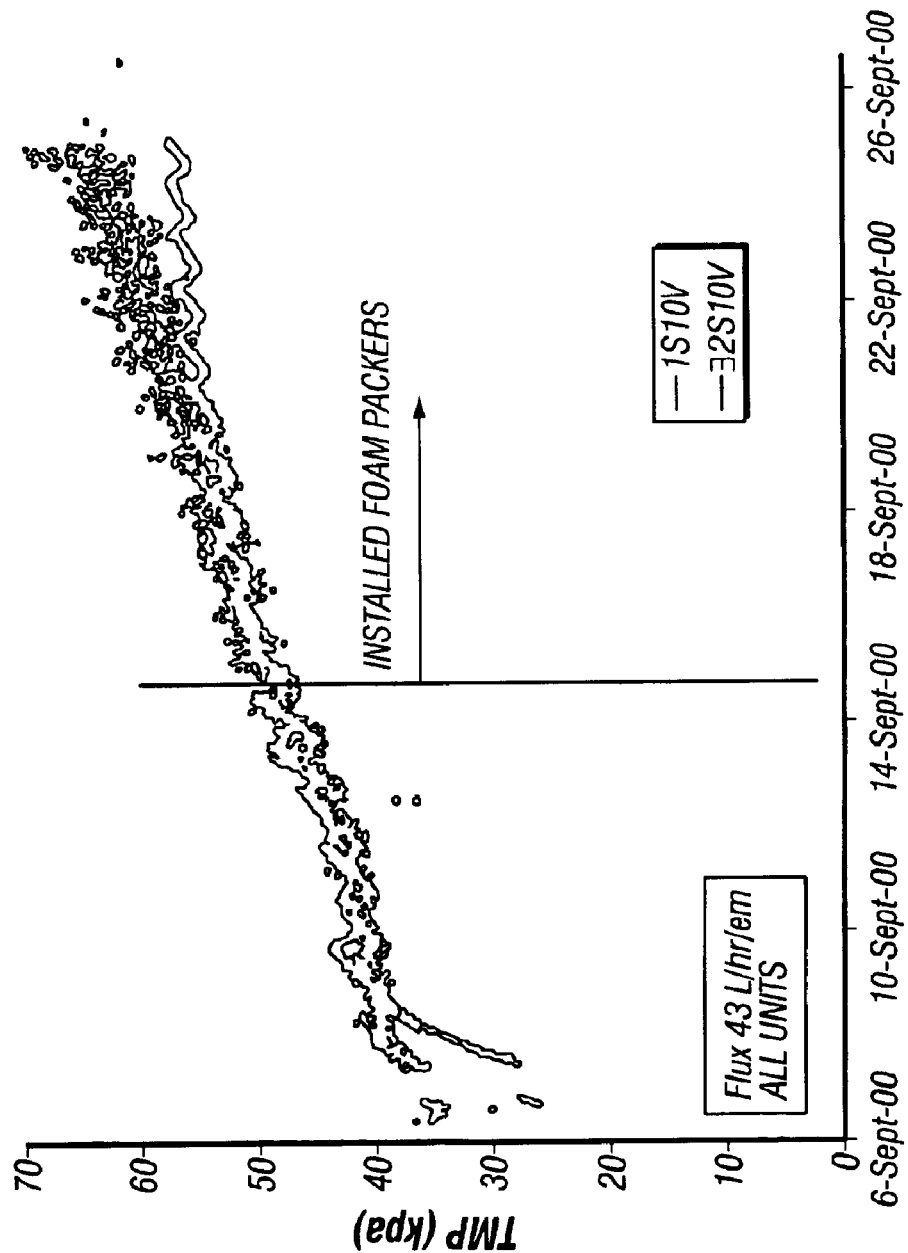
FIG. 12 shows a graph of transmembrane pressure over a period of time for two types of filtration system with a filler system being employed on one system part way through the test period.

FIG. 12 shows the effect on the transmembrane pressure characteristics of two filtration machines. The upper graph shows a machine without the filler members whereas the lower graph shows a machine with filler members employed part way through the test cycle. This graph demonstrates the improved effectiveness of the backwash when filler members are employed.

It will be appreciated that further embodiments and exemplifications of the invention are possible without departing from the spirit or scope of the invention described.

What is claimed is:

1. A membrane filtration system comprising a plurality of porous hollow fiber membranes arranged in bundles forming membrane modules submerged in a feed liquid to be filtered and comprising at least one filler member positioned in a void between said membrane modules, wherein said filler member is immersed in said feed liquid to be filtered so as to occupy a space that would otherwise be occupied by feed liquid, wherein the void between the modules is at least partially filled with the filler member.

2. A membrane filtration system according to claim 1 wherein the modules are submerged in said feed liquid in a tank or a cell open to an atmospheric pressure.

3. A membrane filtration system according to claim 1 wherein the filler member comprises a number of elements which fit together to form an integral unit.

4. A membrane filtration system according to claim 1 wherein said filler member is neutrally buoyant with respect to said feed liquid.

5. A membrane filtration system according to claim 4 wherein said filler member is hollow and is configured to be filled with a fluid to provide said neutral buoyancy.

6. A membrane filtration system according to claim 1 wherein said filler member is spherical in shape.

7. A membrane filtration system according to claim 6 wherein said filler member is hollow and is configured to be filled with a fluid to provide said neutral buoyancy.

8. A membrane filtration system according to claim 1 wherein the filler member comprises a plurality of complementary segments comprising a central element comprising two sets of parallel opposed semi-circular, in cross-section, channels extending longitudinally along a length of the central element, each channel have a diameter sized to accommodate and fit closely around a fibre bundle, and a plurality of side filler segments of generally T-shaped cross-section with half-semi circular sides of a same diameter as said channels configured to engage with said central element to form said filler member.

9. A membrane filtration system according to claim 8 wherein each filler member comprises complementary engagement formations for engaging with associated engagement means on other filler members.

10. A membrane filtration system according to claim 1 wherein the filler member comprises a foamed plastic material.

11. A membrane filtration system according to claim 1 wherein the filler member comprises a blow-moulded plastic material.

12. A membrane filtration system according to claim 1 wherein the filler member comprises a rotor-moulded plastic material.

13. A membrane filtration system according to claim 1 comprising a plurality of filler members.

14. A membrane filtration system according to claim 1 comprising a plurality of voids.

* * * * *